US011804332B2

(12) United States Patent
Park et al.

(10) Patent No.: US 11,804,332 B2
(45) Date of Patent: Oct. 31, 2023

(54) MULTILAYERED ELECTRONIC COMPONENT

(71) Applicant: SAMSUNG ELECTRO-MECHANICS CO., LTD., Suwon-si (KR)

(72) Inventors: Hye Jin Park, Suwon-si (KR); Bon Seok Koo, Suwon-si (KR); Jung Min Kim, Suwon-si (KR); Hong Je Choi, Suwon-si (KR); Byung Woo Kang, Suwon-si (KR); Ji Hye Han, Suwon-si (KR); Sang Wook Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 57 days.

(21) Appl. No.: 17/665,462

(22) Filed: Feb. 4, 2022

(65) Prior Publication Data

US 2023/0170147 A1    Jun. 1, 2023

(30) Foreign Application Priority Data

Nov. 30, 2021    (KR) .................. 10-2021-0168414

(51) Int. Cl.
| | | |
|---|---|---|
| H01G 4/30 | (2006.01) | |
| H01G 4/012 | (2006.01) | |
| H01G 4/12 | (2006.01) | |
| H01G 4/232 | (2006.01) | |
| H01G 2/06 | (2006.01) | |
| H01G 4/008 | (2006.01) | |

(52) U.S. Cl.
CPC .............. *H01G 4/30* (2013.01); *H01G 2/065* (2013.01); *H01G 4/008* (2013.01); *H01G 4/012* (2013.01); *H01G 4/12* (2013.01); *H01G 4/2325* (2013.01)

(58) Field of Classification Search
CPC .......... H01G 4/30; H01G 2/065; H01G 4/008; H01G 4/012; H01G 4/12; H01G 4/2325
See application file for complete search history.

(56) References Cited

U.S. PATENT DOCUMENTS

| | | | |
|---|---|---|---|
| 2017/0301468 A1 | 10/2017 | Kim et al. | |
| 2018/0166215 A1* | 6/2018 | Hamanaka | ............... H01G 4/12 |
| 2018/0254138 A1* | 9/2018 | Koo | ......................... H01F 27/29 |
| 2019/0157006 A1* | 5/2019 | Han | ...................... H01G 4/008 |
| 2019/0295773 A1* | 9/2019 | Kim | ..................... H01G 4/2325 |

FOREIGN PATENT DOCUMENTS

| | | |
|---|---|---|
| KR | 10-2017-0118584 A | 10/2017 |
| KR | 10-2018-0084030 A | 7/2018 |
| KR | 10-2019-0008406 A | 1/2019 |

* cited by examiner

*Primary Examiner* — Michael P McFadden
(74) *Attorney, Agent, or Firm* — Morgan, Lewis & Bockius LLP (57) ABSTRACT

A multilayer electronic component includes: a body including a dielectric layer and a plurality of internal electrodes stacked on each other interposing the dielectric layer therebetween, and external electrodes respectively disposed on the body, wherein the external electrode includes: a first electrode layer connected to the internal electrode; and a second electrode layer disposed on the first electrode layer, and including a conductive portion including an silver (Ag)-tin (Sn) alloy and a resin, and a ratio of an area of the Ag—Sn alloy to an area of the conductive portion satisfies 3 to 50% in at least a portion of a cross-section of the second electrode layer.

23 Claims, 8 Drawing Sheets

FIRST DIRECTION
SECOND DIRECTION

MULTILAYERED ELECTRONIC COMPONENT

CROSS-REFERENCE TO RELATED APPLICATION(S)

This application claims benefit of priority to Korean Patent Application No. 10-2021-0168414 filed on Nov. 30, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an image display device such as a liquid crystal display (LCD) or a plasma display panel (PDP), a computer, a smartphone or a cellular phone, to charge or discharge electricity therein or therefrom.

The multilayer ceramic capacitor is an important chip component used in industries such as communications, computing, home appliances, automotive and the like, because the capacitor has a small size, implements high capacitance, and may be easily mounted. In particular, the multilayer ceramic capacitor is a core passive element used in various electric, electronic, information communications devices such as a mobile phone, a computer, a digital television (TV), etc.

In recent years, as the electronic device has a small size and high performance, the multilayer ceramic capacitor also tends to have the small size and the high performance. In accordance with this tendency, it has become important to secure high reliability of the multilayer ceramic capacitor.

As a method for securing the high reliability of the multilayer ceramic capacitor, disclosed is technology of coating a conductive resin layer on an external electrode thereof to absorb tensile stress occurring in a mechanical or thermal environment when the multilayer ceramic capacitor is mounted on a circuit board, thereby preventing a crack from occurring due to the tensile stress.

This conductive resin layer may electrically and mechanically bond the sintered electrode layer and plating layer of the external electrode of the multilayer capacitor to each other, and may further protect the multilayer ceramic capacitor from mechanical and thermal stress and from warpage impact of a circuit board, caused by a process temperature while the capacitor is mounted on the circuit board.

However, a delamination may occur at an interface between the sintered electrode layer and the conductive resin layer by outgas generated from the conductive resin layer when the conductive resin layer is ref lowed at a high temperature.

In addition, conductive metal particles may be dispersed in the conductive resin layer, which may make the conductive resin layer have weak electrical conductivity, and the electrical connection between the sintered electrode layer and the conductive resin layer may thus also be lower.

To solve this problem, Patent Document 1 suggests a conductive resin layer including an intermetallic compound such as $Ag_3Sn$ to improve electrical and mechanical bonding between the sintered electrode layer and the conductive resin layer.

However, as the conductive resin layer includes more content of $Ag_3Sn$, excess tin (Sn) in the conductive resin layer may be eluted to a surface of the external electrode, which may degrade plating characteristics of the multilayer ceramic capacitor.

RELATED ART DOCUMENT

Patent Document (Patent Document 1) KR 10-2018-0084030 A

SUMMARY

An aspect of the present disclosure may provide a multilayer electronic component capable of preventing a delamination occurring at an interface between a sintered electrode layer and a conductive resin layer by outgas generated from the conductive resin layer when the multilayer electronic component is ref lowed at a high temperature.

Another aspect of the present disclosure may provide a multilayer electronic component capable of solving a problem in which excessive tin (Sn) in the conductive resin layer is eluted to a surface of an external electrode, thereby degrading its plating characteristics.

Another aspect of the present disclosure may provide a multilayer electronic component capable of solving a problem in which electrical connection between the sintered electrode layer and the conductive resin layer is weak due to conductive metal particles dispersed in the conductive resin layer.

However, the present disclosure is not limited to the description above, and may be more readily understood in the description of exemplary embodiments of the present disclosure.

According to an aspect of the present disclosure, a multilayer electronic component may include: a body including a dielectric layer and a plurality of internal electrodes stacked on each other interposing the dielectric layer therebetween, and external electrodes respectively disposed on the body, wherein the external electrode includes: a first electrode layer connected to the internal electrode; and a second electrode layer disposed on the first electrode layer, and including a conductive portion including an silver (Ag)-tin (Sn) alloy and a resin, and a ratio of an area of the Ag—Sn alloy to an area of the conductive portion satisfies 3 to 50% in at least a portion of a cross-section of the second electrode layer.

According to an aspect of the present disclosure, a multilayer electronic component may include: a body including a dielectric layer and a plurality of internal electrodes stacked on each other interposing the dielectric layer therebetween, and external electrodes respectively disposed on the body, wherein the external electrode includes: a first electrode layer connected to the internal electrode; and a second electrode layer disposed on the first electrode layer, and including a conductive portion including an silver (Ag)-tin (Sn) alloy, an intermetallic compound containing tin (Sn), and a resin, a ratio of an area of the Ag—Sn alloy to an area of the conductive portion satisfies 3 to 50% in at least a portion of a cross-section of the second electrode layer, and a total area of the Ag—Sn alloy and the intermetallic compound in at least a portion of the cross-section of the second electrode layer is higher than a total area of the Ag—Sn alloy and the intermetallic compound in at least a portion of a cross-section of the first electrode layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may indicate a direction (or thickness (T) direction) in which electrodes are stacked on each other, a second direction may indicate a length (L) direction, and a third direction may indicate a width (W) direction.

Hereinafter, a multilayer electronic component 100 according to an exemplary embodiment of the present disclosure is described with reference to FIGS. 1 through 3.

The multilayer electronic component 100 according to an exemplary embodiment of the present disclosure may include: a body 110 including a dielectric layer 111 and a plurality of internal electrodes 121 and 122 stacked on each other interposing the dielectric layer therebetween; and external electrodes 130 and 140 disposed on the body, wherein the external electrode includes first electrode layers 131 and 141 connected to the internal electrodes, second electrode layers 132 and 142 respectively disposed on the first electrode layer, and including conductive portions 132a and 142a each including an silver (Ag)-tin (Sn) alloy and the resins 132b and 142b, and a ratio of an area of the Ag—Sn alloy to each area of the conductive portions 132a and 142a satisfies 3 to 50% in at least a portion of each cross-section of the second electrode layers 132 and 142.

The body 110 may include the dielectric layer 111 and the first or second internal electrode 121 or 122, which are alternately stacked on each other.

Figure 1:
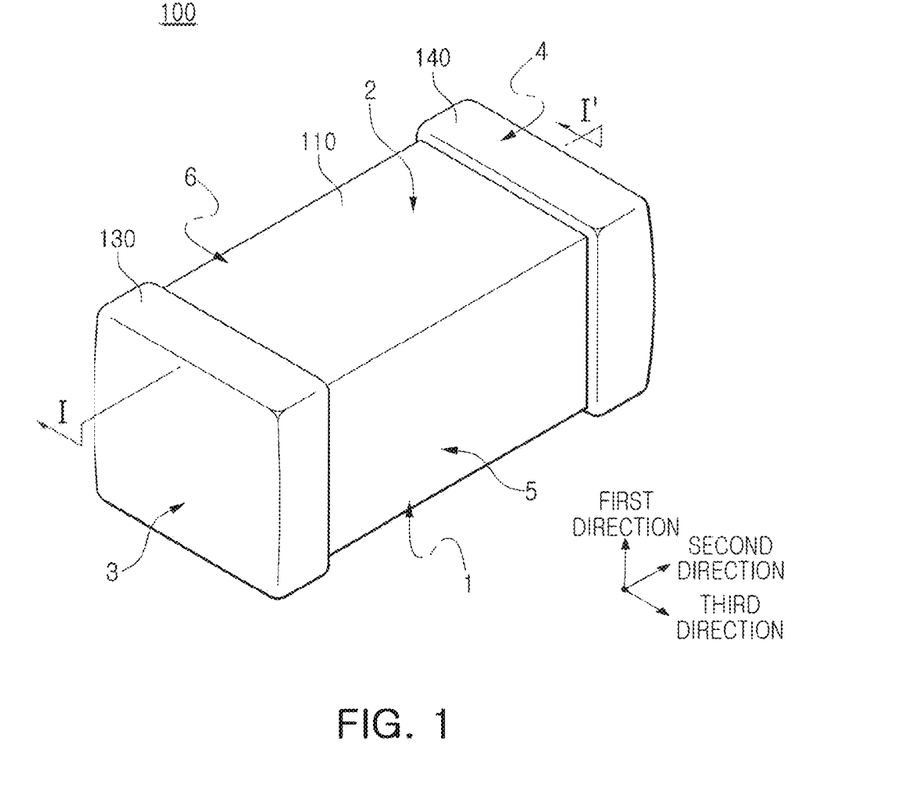
FIG. 1 is a perspective view schematically showing a multilayer electronic component according to an exemplary embodiment of the present disclosure.
Figure 2:
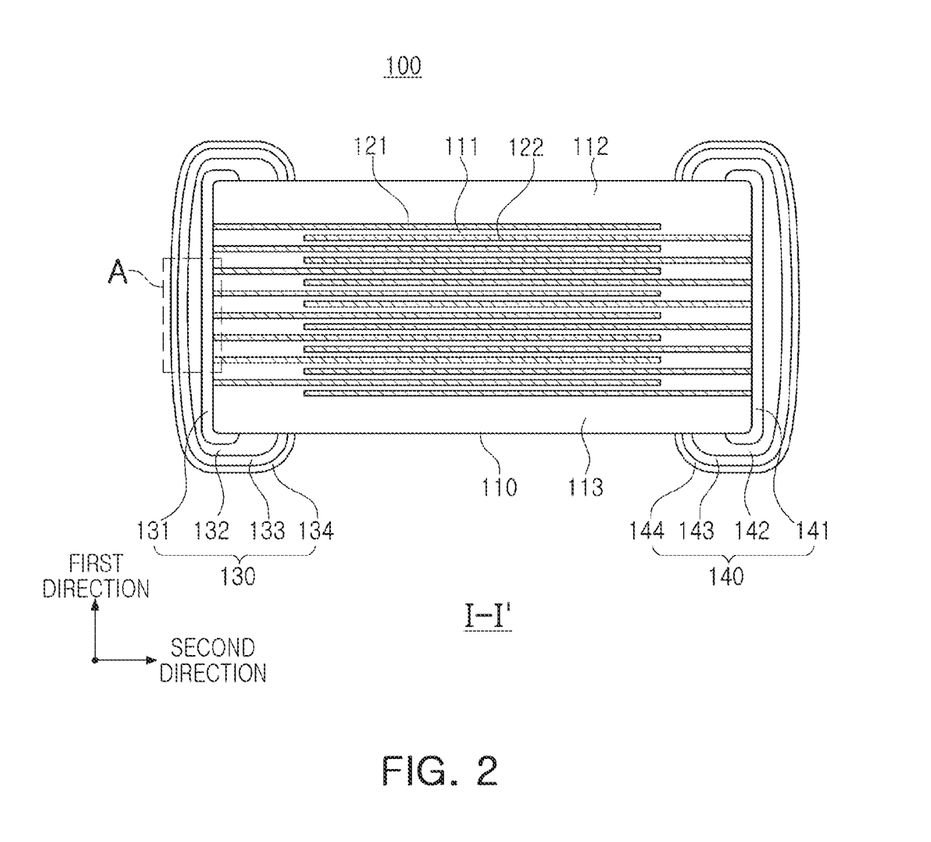
FIG. 2 is a cross-sectional view taken along line I-I' of FIG. 1.

The body 110 is not limited to a particular shape, and may have a hexahedral shape or a shape similar to the hexahedral shape, as shown in FIG. 1. The body 110 may not have a shape of the hexahedron having perfectly straight lines because a ceramic powder included in the body 110 is contracted or its edge is polished in a process in which the body is sintered. However, the body 110 may substantially have the hexahedral shape.

The body 110 may have first and second surfaces 1 and 2 opposing each other in the first direction third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 included in the body 110 may already be sintered, and adjacent dielectric layers 111 may thus be integrated with each other, thus making it difficult to confirm a boundary therebetween without using a scanning electron microscope (SEM).

A material included in the dielectric layer 111 is not particularly limited as long as the dielectric layer obtains sufficient capacitance. For example, the dielectric layer may use a material such as a barium titanate-based material, a lead composite perovskite-based material or a strontium titanate-based material. The barium titanate-based material may include the barium titanate ($BaTiO_3$) based ceramic powder, and this ceramic powder may be, for example, $BaTiO_3$ or $(Ba_{1-x}Ca_x)TiO_3$, Ba $(Ti_{1-y}Ca_y)O_3$, $(Ba_{1-x}Ca_x)(Ti_{1-y}Zr_y)O_3$, Ba $(Ti_{1-y}Zr_y)O_3$ and the like, in which calcium (Ca), zirconium (Zr) or the like is partially dissolved in $BaTiO_3$.

Here, the dielectric layer 111 may have an average thickness arbitrarily changed based on a capacitance design of the multilayer electronic component 100, and have the average thickness of 0.1 to 10 μm after being sintered in consideration of the size and capacitance of the body 110. However, the present disclosure is not limited thereto.

The body 110 may include the first internal electrode 121 and the second internal electrode 122, a capacitance forming portion forming the capacitance, and cover portions 112 and 113 respectively formed on upper and lower portions of the capacitance forming portion.

The upper cover portion 112 and the lower cover portion 113 may be formed by stacking a single dielectric layer or two or more dielectric layers on the upper and lower surfaces of the capacitance forming portion in the first direction or thickness direction, respectively, and may basically prevent damage to the internal electrodes due to physical or chemical stress.

The upper and lower cover portions 112 and 113 may have the same material and configuration as those of the dielectric layer 111 of the capacitance forming portion, except that the cover portions do not include any internal electrode. The upper and lower cover portions 112 and 113 may each have a thickness of 25 μm or less. However, the present disclosure is not limited thereto.

The internal electrodes 121 and 122 may each be disposed alternately with the dielectric layer 111, and disposed opposing each other interposing the dielectric layer 111 therebetween.

That is, the first and second internal electrodes 121 and 122 are a pair of electrodes having different polarities; may be made by printing a conductive paste for internal electrodes, including a conductive metal having a predetermined thickness on the dielectric layer 111; may be disposed to interpose the dielectric layer 111 therebetween and to be alternately exposed through the third and fourth surfaces 3 and 4 of the body 110 in a direction in which the dielectric layer 111 is stacked; and may be electrically insulated from each other by the dielectric layer 111 disposed therebetween.

Therefore, the first internal electrode 121 may be in contact with and electrically connected to the first external electrode 130 on the third surface 3, and the second internal electrode 122 may be in contact with and electrically connected to the second external electrode 140 on the fourth surface 4.

Each average thickness of these first and second internal electrodes 121 and 122 may be determined depending on their applications, and may be 0.2 to 1.0 μm in consideration of the size and capacitance of the body 110 for example. However, the present disclosure is not limited thereto.

The conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti) and an alloy thereof. However, the present disclosure is not limited thereto.

The first electrode layers 131 and 141 may be directly connected to the first and second internal electrodes 121 and 122, respectively, to secure electrical conduction between the external electrodes 130 and 140 and the internal electrodes 121 and 122. That is, the first electrode layers 131 and 141 may respectively be disposed on the third and fourth surfaces 3 and 4 of the body 110, and connected with the first and second internal electrodes 121 and 122 alternately exposed through the third and fourth surfaces 3 and 4 of the body 110, respectively, thereby securing the electrical conduction between the first and second external electrodes 130 and 140 and the first and second internal electrodes 121 and 122.

Here, the first electrode layers 131 and 141 may include the conductive metal and glass, and may be sintered electrodes. The conductive metal may be, for example, one of silver (Ag), palladium (Pd), platinum (Pt), nickel (Ni), and copper (Cu) or an alloy thereof, and may be copper (Cu). The first electrode layer may have an amount of tin (Sn) that is lower than an amount of tin (Sn) in the second electrode layer. The amount of tin (Sn) may be determined by, for example, elemental analysis of each electrode layer, by energy dispersive x-ray spectroscopy (EDS) in combination with SEM or by other methods known to one of ordinary skill in the art.

The glass may have a composition in which oxides are mixed with each other, and may be at least one selected from the group consisting of silicon oxide, boron oxide, aluminum oxide, transition metal oxide, alkali metal oxide and alkaline earth metal oxide. However, the present disclosure is not limited thereto.

The first electrode layers 131 and 141 may respectively be extended from the third and fourth surfaces 3 and 4 of the body 110 to portions of the first and second surfaces 1 and 2 and portions of the fifth and sixth surfaces 5 and 6 of the body 110.

Figure 3:
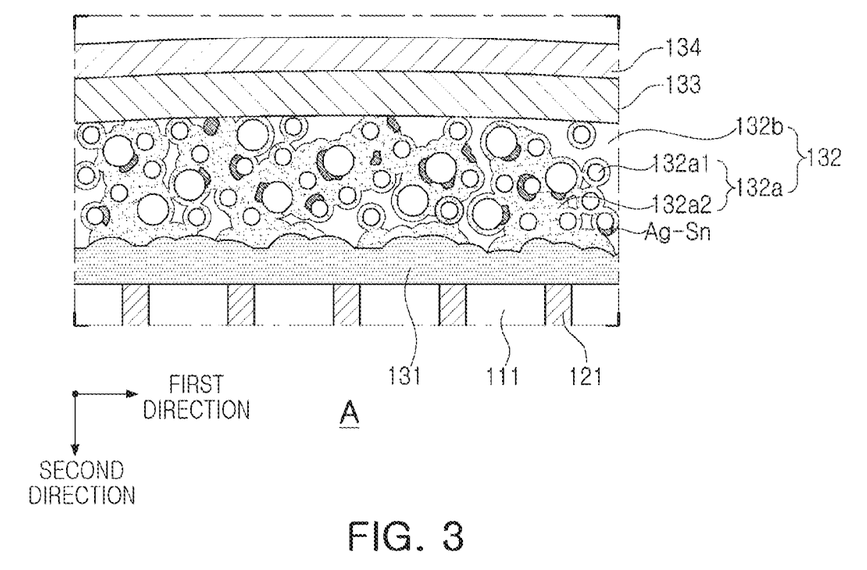
FIG. 3 is an enlarged view of a region "A" of FIG. 2.

FIG. 3 is an enlarged view of a region "A" which is a portion of the first external electrode 130. In this regard, configurations of the first external electrode 130 and the second external electrode 140 are similar to each other except that the first external electrode 130 is connected to the first internal electrode 121, and the second external electrode 130 is connected to the second internal electrode 122. Therefore, the description hereinafter describes the first external electrode 130, which may be considered to also include the description of the second external electrode 140.

The second electrode layer 132 may be disposed on the electrode layer 131, and include the conductive portion 132a including the Ag—Sn alloy and the resin 132b. Here, the conductive portion 132a may have electrical conductivity, and the resin 132b may have electrical insulation.

The resin 132b may mechanically bond the first electrode layer 131 and third electrode layers 133 and 134 formed on the second electrode layer 132 to each other, may give elasticity to the external electrode 130 to absorb tensile stress occurring in a mechanical or thermal environment when the multilayer electronic component 100 is mounted on a circuit board, thereby preventing a crack from occurring in the multilayer electronic component 100, and may protect the multilayer electronic component 100 from warpage impact of the circuit board.

The conductive portion 132a may include, for example, the conductive metal, and $Ag_3Sn$ may be the silver (Ag)-tin (Sn) alloy included in the conductive portion 132a. Here, $Ag_3Sn$ may refer to an intermetallic compound formed by an interaction of silver (Ag) and tin (Sn) or a tin (Sn) alloy, which is a low-melting metal, which are included in a conductive resin composition included in the second electrode layer 132.

The conductive portion 132a may have a network structure in which the conductive metals are connected to each other, and may electrically connect the first electrode layer 131 and the third electrode layers 133 and 134 to each other. In particular, silver (Ag) may easily form the Ag—Sn alloy because of its high reactivity with tin (Sn) among the metals, and may thus improve connection between the conductive metals of the second electrode layer 132. Accordingly, the conductive portion 132a may have the electrical connection improved compared to a conventional conductive resin layer that secures electrical connection by using a hopping conduction mechanism.

According to an exemplary embodiment of the present disclosure, the ratio of an area of the Ag—Sn alloy to the area of the conductive portion 132a may be 3 to 50% in at least a portion of the cross-section of the second electrode layer 132. When the above condition is satisfied, the conductive portion 132a may have the excellent network structure by having the improved connection between the conductive metals of the second electrode layer 132. Accordingly, the multilayer electronic component 100 may have enhanced electrical characteristics such as the improved capacitance and reduced equivalent series resistance (ESR) characteristics.

In addition, when the above condition is satisfied, the conductive portion 132a having the network structure may be connected to the first electrode layer 131, there by suppressing a delamination from occurring at an interface between the first electrode layer 131 and the second electrode layer 132. Accordingly, the conductive portion 132a may also secure the excellent mechanical and electrical connection between the first electrode layer 131 and the second electrode layer 132.

Conventionally, the delamination may occur at the interface between the sintered electrode layer 131 and the second electrode layer 132 by outgas generated from the second electrode layer 132 when the second electrode layer 132 is ref lowed. The ref low may indicate a heat treatment for melting solder and welding the same when the multilayer electronic component 100 is mounted on the circuit board by using the solder.

Meanwhile, according to the multilayer electronic component 100 according to the exemplary embodiment of the present disclosure, the ratio of an area of the Ag—Sn alloy to the area of the conductive portion 132a may be adjusted to 3 to 50% to secure a bonding force between the first electrode layer 131 and the second electrode layer 132 even when the multilayer electronic component 100 is reflowed at a high-temperature for example, thereby suppressing the delamination from occurring at the interface between the first electrode layer 131 and the second electrode layer 132.

When the ratio of an area of the Ag—Sn alloy to the area of the conductive portion 132a is less than 3% in at least a portion of the cross-section of the second electrode layer 132, the Ag—Sn alloy may not be sufficiently distributed in the conductive portion 132a, which may cause weaker connection between the conductive metals of the second electrode layer 132. Accordingly, the delamination may occur at the interface between the first electrode layer 131 and the second electrode layer 132.

When the ratio of an area of the Ag—Sn alloy to the area of the conductive portion 132a is more than 50% in at least a portion of the cross-section of the second electrode layer 132, excess tin (Sn) in the conductive portion 132a may be eluted to an outer surface of the second electrode layer 132. Accordingly, a plating layer may not be uniformly formed on the second electrode layer 132, and the multilayer electronic component 100 may thus have deteriorated mount characteristics.

For example, the Ag—Sn alloy $Ag_3Sn$ may be formed when silver (Ag) and tin (Sn) react with each other in an atomic ratio of 3:1, and Cu6Sn5 may be formed when copper (Cu) and tin (Sn) react with each other in an atomic ratio of 6:5. That is, an amount of tin (Sn) consumed when $Ag_3Sn$ is formed may be less than the amount of tin (Sn) consumed when Cu6Sn5 is formed. Accordingly, when the ratio of the Ag—Sn alloy is excessively high, silver (Ag) having high reactivity with tin (Sn) may preferentially form the Ag—Sn alloy. Excess tin (Sn) may thus be generated in the conductive portion 132a and eluted to the outer surface of the second electrode layer 132.

For example, the area of the conductive portion 132a and the area of the Ag—Sn alloy may be measured in such a manner that: the second electrode layer 132 is polished in the first and second directions to one-half the length in the third direction; a region "E" is then captured by using a scanning electron microscope (SEM), in which the region "E" has an area having a value of a length of the second electrode layer 132 in the first direction * a length of the second electrode layer 132 in the second direction=60 μm×20 μm, based on a central point of the second electrode layer 132, disposed on each of the third and fourth surfaces 3 and 4 of the body, in the first direction; and the area may then be measured using an ImageJ program.

Here, the conductive portion 132a may include a plurality of metal particles 132a1 and a connection portion 132a2 connected to the plurality of metal particles, and the Ag—Sn alloy may be included in the connection portion 132a2.

The connection portion 132a2 may further include a first intermetallic compound, and the Ag—Sn alloy and the first intermetallic compound may indicate an intermetallic compound formed when some of the plurality of metal particles 132a1 in the second electrode layer 132 react with tin (Sn) or the tin (Sn) alloy.

Accordingly, the Ag—Sn alloy and the first intermetallic compound may be formed in the second electrode layer 132, and may form the connection portion 132a2 by being metal-bonded with tin (Sn) or the tin (Sn) alloy remaining after the intermetallic compound is formed.

For example, the Ag—Sn alloy may be $Ag_3Sn$ formed by a reaction between silver (Ag) and tin (Sn) included in the conductive resin composition included in the second electrode layer 132. In addition, the first intermetallic compound may include at least one of $Cu_3Sn$ and $Cu_6Sn_5$, formed when copper (Cu) and tin (Sn), included in the conductive resin composition included in the second electrode layer 132, react with each other. A total area of the Ag—Sn alloy and the intermetallic compound containing tin (Sn) in at least a portion of the cross-section of the second electrode layer may be higher than a total area of the Ag—Sn alloy and the intermetallic compound containing tin (Sn) in at least a portion of a cross-section of the first electrode layer. The total area of the Ag—Sn alloy and the intermetallic compound containing tin (Sn) in at least a portion of the cross-section of the second electrode layer may be the area of the conductive portion. The total area of the Ag—Sn alloy and the intermetallic compound containing tin (Sn) in at least a portion of a cross-section of the first electrode layer may be measured by, for example, SEM and EDS, and analyzed using an ImageJ program. The areas of the cross-section of the first and second electrode layers being analyzed may be the same.

Accordingly, the plurality of metal particles 132a1 may include at least one of silver (Ag) and silver (Ag) coated copper (Cu), and further include at least one of copper (Cu) and tin (Sn) coated copper (Cu). In addition, the connection portion 132a2 may include at least one of tin (Sn) and the tin (Sn) alloy.

In an exemplary embodiment of the present disclosure, at least a portion of the connection portion 132a2 may be in direct contact with at least a portion of the first electrode layer 131. The first and second electrode layers 131 and 132 may thus have the improved mechanical and electrical connection therebetween by the metal-to-metal bonding between the conductive metal included in the first electrode layer 131 and the connection portion 132a2 of the second electrode layer 132.

In an exemplary embodiment of the present disclosure, the external electrode 130 may include the third electrode layers 133 and 134 disposed on the second electrode layer 132. Here, the third electrode layers 133 and 134 may be the plating layers.

The third electrode layers 133 and 134 may improve the mount characteristics of the multilayer electronic component 100. The third electrode layers 133 and 134 may each include at least one of nickel (Ni), tin (Sn), copper (Cu), palladium (Pd) and an alloy thereof, and may be the plurality of layers.

Here, at least a portion of the connection portion 132a2 may be in direct contact with at least a portion of the first electrode layer 131 and at least a portion of the third electrode layers 133 and 134. It is thus possible to further improve the electrical connection and mechanical bonding force between the first electrode layer 131, the second electrode layer 132, and the third electrode layers 133 and 134.

In an exemplary embodiment of the present disclosure, the third electrode layers 133 and 134 may be a nickel (Ni) plating layer 133 and a tin (Sn) plating layer 134, sequentially stacked on the second electrode layer 132.

Here, the nickel plating layer 133 may be in contact with the connection portion 132a2 and resin 132b of the second electrode layer 132. The nickel plating layer 133 may prevent the solder from being dissolved when the multilayer electronic component 100 is mounted on the circuit board.

In addition, the tin plating layer 134 formed on the nickel plating layer 133 may improve wettability of the solder when the multilayer electronic component 100 is mounted on the circuit board.

Figure 4:
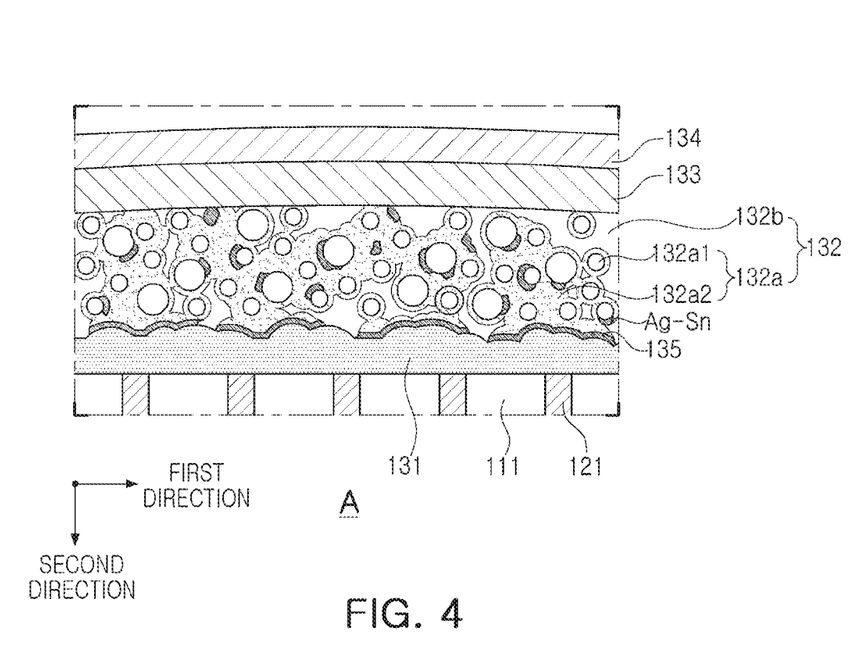
FIG. 4 is an enlarged view of the region "A" of FIG. 2 showing an exemplary embodiment of the present disclosure.

Referring to FIG. 4, in an exemplary embodiment of the present disclosure, the multilayer electronic component 100 may further include an interface layer 135 formed between the first and second electrode layers 131 and 132 and including a second intermetallic compound.

Here, the second intermetallic compound may indicate an intermetallic compound formed when the conductive metal included in the first electrode layer 131 reacts with tin (Sn) or the tin (Sn) alloy included in the second electrode layer 132.

For example, the second intermetallic compound may be $Cu_3Sn$ formed when copper (Cu) included in the first electrode layer 131 and tin (Sn) included in the second electrode layer 132 react with each other. The interface layer 135 may be formed when tin (Sn) is diffused into the first electrode layer 131 in a process in which the second electrode layer 132 is formed by coating the conductive resin composition on the first electrode layer 131 and drying and curing the same by the heat treatment.

The interface layer 135 may be formed at the interface between the first and second electrode layers 131 and 132, and may connect the first electrode layer 131 and the connection portion 132a2 to each other by including the second intermetallic compound, thereby securing excellent mechanical and electrical connection between the first electrode layer 131 and the second electrode layer 132.

Here, the interface layer 135 may be disposed in a shape of a plurality of islands, and the plurality of islands may have a shape of a layer.

Figure 5:
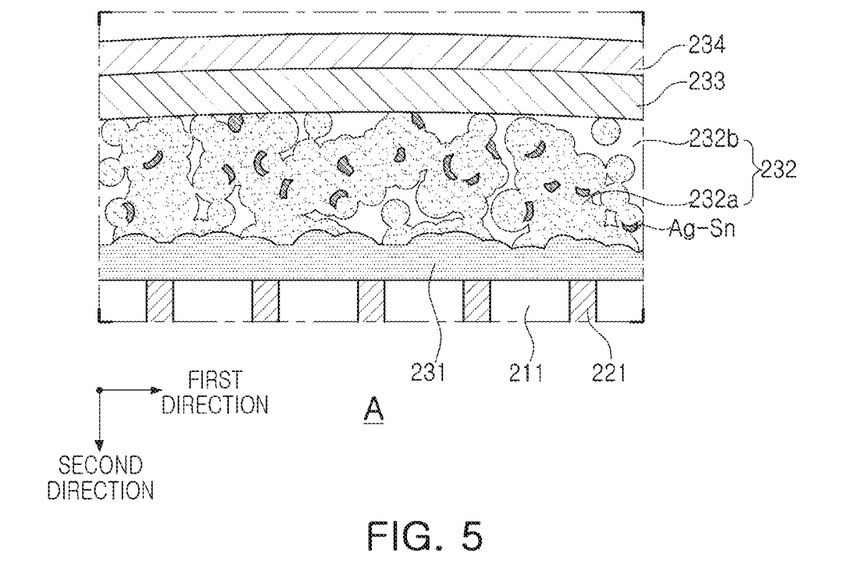
FIG. 5 is an enlarged view of the region "A" of FIG. 2 showing an exemplary embodiment of the present disclosure.

Meanwhile, referring to FIG. 5, the plurality of metal particles may all react with tin (Sn) or the tin (Sn) alloy included in the conductive resin composition included in a second electrode layer 232, and may not exist in the second electrode layer 232.

Accordingly, in an exemplary embodiment of the present disclosure, the second electrode layer 232 may include a conductive portion 232a including the Ag—Sn alloy and a resin 232b, and the conductive portion 232a may further include the first intermetallic compound. That is, the second electrode layer 232 may not include the plurality of metal particles. The conductive portion 232a may have a network structure in which the Ag—Sn alloy and the first intermetallic compound are connected to each other, thereby improving the mechanical and electrical connections between the conductive metals of the second electrode layer 232.

Here, the Ag—Sn alloy may be $Ag_3Sn$ formed by a reaction between silver (Ag) and tin (Sn) included in the conductive resin composition included in the second electrode layer 232. In addition, the first intermetallic compound may include at least one of $Cu_3Sn$ and $Cu_6Sn_5$, formed when copper (Cu) and tin (Sn), included in the conductive resin composition included in the second electrode layer 232 react with each other. In addition, the conductive portion 232a may include at least one of tin (Sn) and the tin (Sn) alloy.

Hereinafter, the description specifically describes a method of manufacturing a multilayer electronic component according to an exemplary embodiment of the present disclosure, and the present disclosure is not limited thereto. The description of the method of manufacturing a multilayer electronic component of the present embodiment omits a description overlapping the description of the multilayer electronic component described above.

The multilayer electronic component according to an exemplary embodiment of the present disclosure may be manufactured by the following method: a plurality of ceramic green sheets may first be prepared by coating a slurry including powder such as barium titanate ($BaTiO_3$) on a carrier film and drying the same.

The ceramic green sheet may be manufactured by mixing the ceramic powder, a binder and a solvent with one another to prepare the slurry and manufacturing the slurry in a shape of a sheet having a thickness of several micrometers by a doctor blade method or the like.

Next, an internal electrode may be formed by coating the conductive paste for the internal electrode, including the conductive metal such as nickel (Ni), on the ceramic green sheet by using a screen printing method or the like.

The body including the dielectric layer and the cover portion may then be formed by stacking the plurality of layers of ceramic green sheets, on which the internal electrodes are printed, stacking the plurality of layers of ceramic green sheets, on which the internal electrodes are not printed, on the upper and lower portions of the multilayer body, and sintering these ceramic green sheets.

Next, the first electrode layer may be formed on the third and fourth surfaces of the body to be connected to the first and second internal electrodes whose ends are exposed to the third and fourth surfaces of the body.

The first electrode layer may be formed by coating the conductive metal such as copper (Cu) and the conductive paste for the external electrode including glass on one surface and the other surface of the body.

The first electrode layer may be formed using a dipping method, and is not limited to this method. The first electrode layer may be formed using a method of attaching or transferring a sheet, an electroless plating method or a sputtering method.

Next, the second electrode layer including the conductive portion and the resin may be formed by coating the conductive resin composition including the plurality of metal particles and the resin on the first electrode layer and curing the same by using the heat treatment. Here, the conductive resin composition may include a Sn-based solder powder.

The plurality of metal particles may include at least one of silver (Ag) and silver (Ag) coated copper (Cu), and the resin may be a thermosetting resin having the electrical insulation. Here, the thermosetting resin may be, for example, an epoxy resin, and a resin that is liquid at room temperature due to its small molecular weight among a bisphenol-A resin, a glycol epoxy resin, a novolac-epoxy resin or a derivative thereof. However, the present disclosure is not limited thereto.

For example, the conductive resin composition may be prepared by mixing Ag powder, Cu powder, Ag coated Cu powder, Sn-based solder powder and thermosetting resin with one another, and dispersing the same by using a three-roll mill. The Sn-based solder powder may include at least one of Sn, $Sn_{96.5}Ag_{3.0}Cu_{0.5}$, $Sn_{42}Bi_{58}$ and $Sn_{72}Bi_{28}$, and a size of an Ag particle included in the Ag powder may be 0.5 to 3 μm. However, the present disclosure is not limited thereto.

Here, the Ag—Sn alloy and the first intermetallic compound may be formed by coating the conductive resin composition on the first electrode layer, drying and curing the same. The plurality of metal particles may all react with tin (Sn) or the tin (Sn) alloy during a curing process, and the metal particle may not exist in the second electrode layer.

Further, during the curing process, the Sn-based solder included in the conductive resin composition and Cu included in the first electrode layer may react with each other to form the second intermetallic compound. Accordingly, the interface layer including the second intermetallic compound may be formed between the first electrode layer and the second electrode layer.

The ratio of an area of the Ag—Sn alloy included in the second electrode layer may be controlled by adjusting an amount of the Ag powder, an amount of the Sn solder powder, and an amount of the Cu powder coated with Ag.

In addition, the method may further include forming the third electrode layer on the second electrode layer. For example, the nickel plating layer may be formed on the second electrode layer, and the tin plating layer may be formed on the nickel plating layer.

Experimental Example

Performed are measurements of whether the delamination occurs in the second electrode layer 132 and whether Sn is eluted, based on the ratio of an area of the Ag—Sn alloy to the area of the conductive portion 132a included in the second electrode layer 132, and the results are then shown in Table 1 below.

Figure 6:
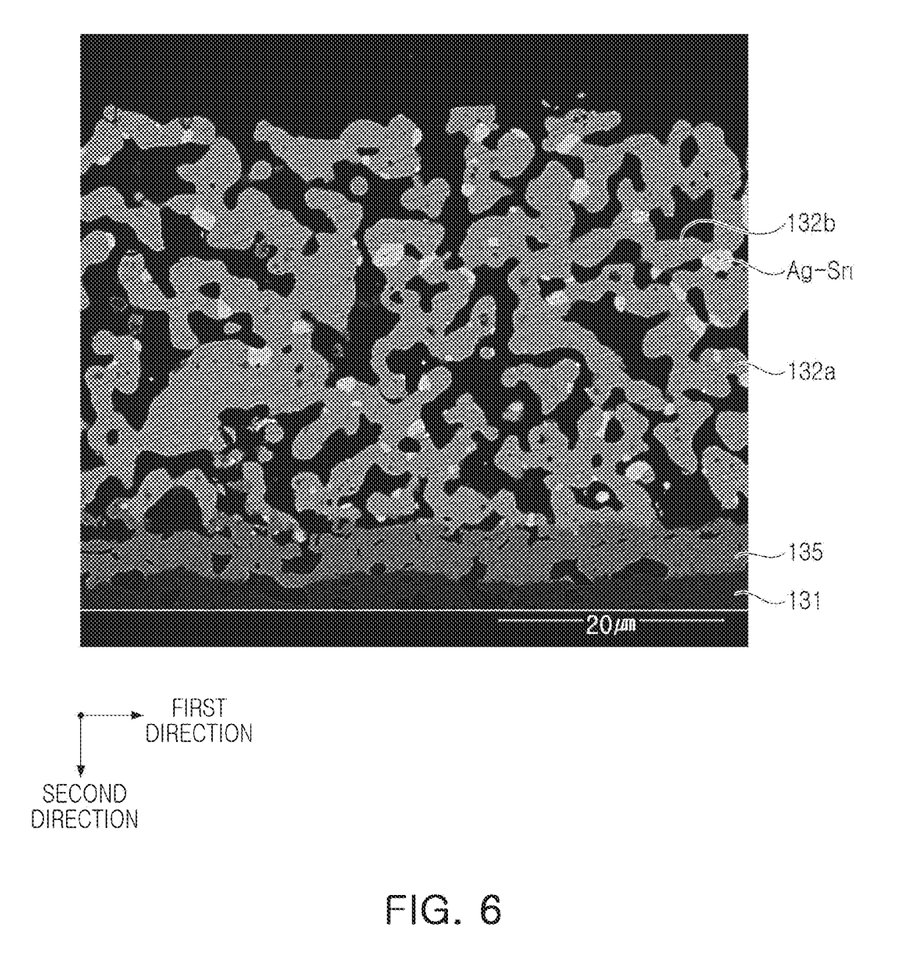
FIG. 6 shows an image obtained by capturing a cross section of a vicinity of the region "A" of the multilayer electronic component according to an exemplary embodiment of the present disclosure, by using a scanning electron microscope (SEM)

FIG. 6 shows an image of a cross-section of the second electrode layer 132, captured by using afield emission scanning electron microscope (FE-SEM). In more detail, the image is an image obtained by capturing a partial region of the second electrode layer 132 disposed on the third surface 3 of the body, based on the central point of the second electrode layer 132 in the first direction, after the second electrode layer 132 is polished in the first and second directions to one-half the length in the third direction.

Here, it is confirmed that a relatively bright region in the conductive portion 132a includes the Ag—Sn alloy, i.e. $Ag_3Sn$, by analyzing components of the image by using energy dispersive x-ray spectroscopy (EDS). Furthermore, it is confirmed that a relatively dark region in the conductive portion 132a includes $Cu_3Sn$ and $Cu_6Sn_5$.

Figure 7A:
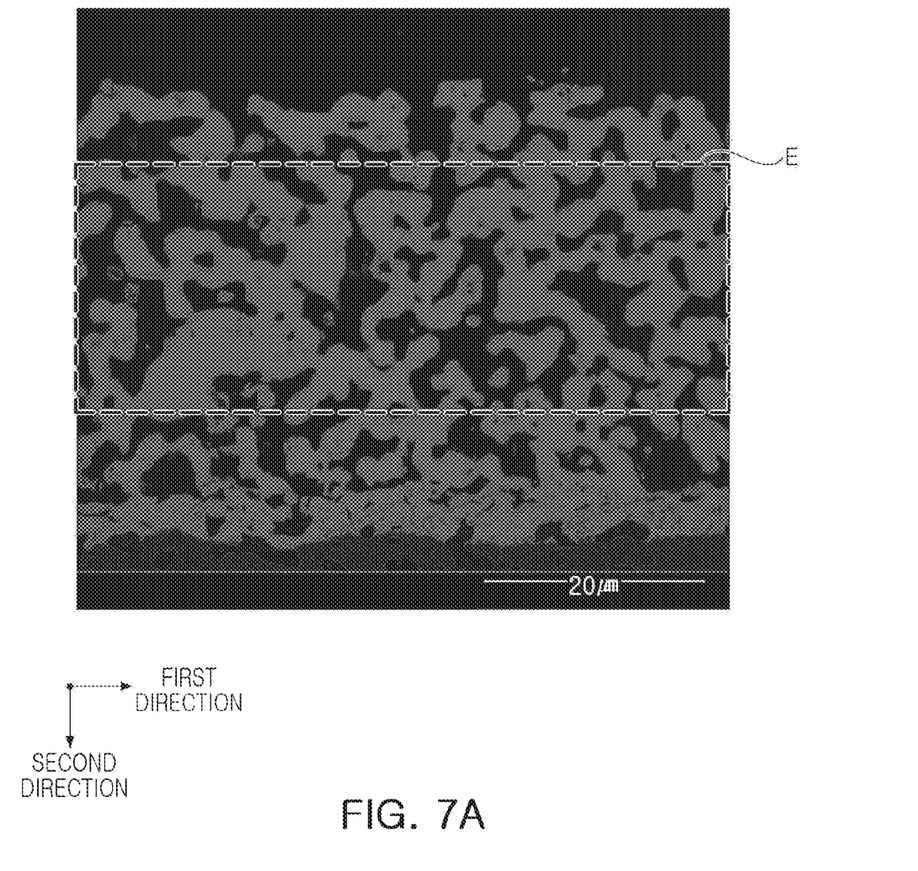
FIG. 7A is a grayscale image of a region of FIG. 6, in which a conductive portion is formed.

Referring to FIG. 7A, the image obtained by using the SEM shows that the region "E" has an area having a value of a length of the second electrode layer 132 in the first direction*a length of the second electrode layer 132 in the second direction=60 μm×20 μm, based on the central point of the second electrode layer 132, disposed on the third surface 3 of the body, in the first and second directions, and a region including the conductive portion 132a is colored or in a lighter shade of gray.

Figure 7B:
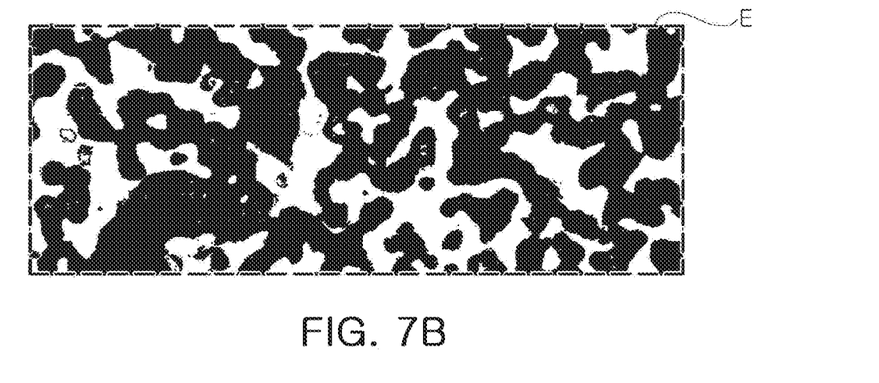
FIG. 7B is a black-and-white image of the region "E" of FIG. 7A.

Referring to FIG. 7B, the region including the conductive portion 132a is marked in black and white by using the ImageJ program, in which the conductive portion 132a is marked in black and the resin 132b is marked in white. Here, a void in the first electrode layer 131 or the second electrode layer 132 is not marked in black. An area of the conductive portion 132a in an entire area of the region "E" is then measured.

Figure 8A:
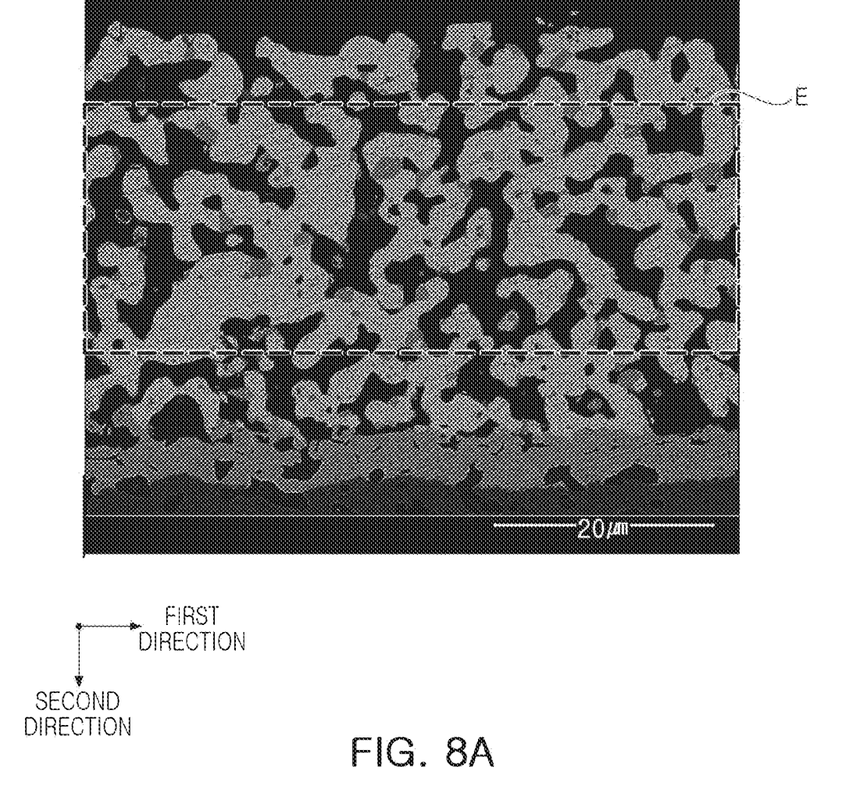
FIG. 8A is a grayscale image of the region "E" of FIG. 6, in which an Ag—Sn alloy is formed.

Referring to FIG. 8A, as described above, the image obtained by using the SEM shows that the region "E" has the area having a value of a length of the second electrode layer 132 in the first direction * a length of the second electrode layer 132 in the second direction=60 μm×20 μm, based on the central point of the second electrode layer 132, disposed on the third surface 3 of the body, in the first and second directions, and a region including the Ag—Sn alloy is colored or in a darker shade of gray.

Figure 8B:
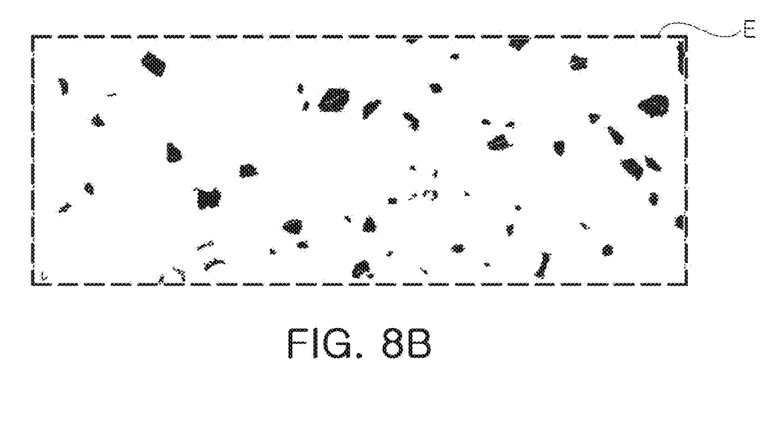
FIG. 8B is a black-and-white image of the region "E" of FIG. 8A.

Referring to FIG. 8B, the region including the Ag—Sn alloy is marked in black and white by using the ImageJ program, in which the Ag—Sn alloy is marked in black and the rest region is marked in white. Here, a void in the first electrode layer 131 or the second electrode layer 132 is not marked in black. An area of the Ag—Sn alloy in the entire area of the region "E" is then measured. The ratio S of an area of the Ag—Sn alloy to the area of the conductive portion 132a in the area of the region "E" is then shown in Table 1.

In order to determine whether the delamination occurs, each sample is mounted on the circuit board in a direction parallel or perpendicular to the direction in which the internal electrodes are stacked on each other, and the mounted sample is then reflowed. The sample mounted on the circuit board is then cut in the first and second directions. Both sides of the external electrode of each sample are then captured by using X-ray, and it is determined that the delamination occurs when there is a bright band on the external electrode. Here, NG indicates a case in which the delamination occurs and OK indicates a case in which the delamination does not occur, for 30 samples per sample number.

In order to determine whether Sn is eluted, the external electrode of each sample before the third electrode layers 133 and 134 are formed is cut in the first direction and the second direction. Both sides of the external electrode of each sample are then respectively captured by using the SEM to check whether Sn is eluted to the outer surface of the second electrode layer 132. Here, NG indicates a case in which the Sn elution occurs and OK indicates a case in which the Sn elution does not occur, for 30 samples per sample number.

TABLE 1

| Sample | S (%) | delamination | Sn elution |
|---|---|---|---|
| 1* | 1.5 | NG (17/30) | OK |
| 2* | 1.9 | NG (20/30) | OK |
| 3* | 2.5 | NG (8/30) | OK |
| 4* | 2.6 | NG (10/30) | OK |
| 5 | 3.4 | OK | OK |
| 6 | 4.1 | OK | OK |
| 7 | 7.5 | OK | OK |
| 8 | 43.6 | OK | OK |
| 9 | 46.9 | OK | OK |
| 10* | 52.0 | OK | NG (6/30) |
| 11* | 53.9 | OK | NG (9/30) |
| 12* | 54.9 | OK | NG (11/30) |
| 13* | 56.0 | OK | NG (20/30) |

*indicates a comparative example.

Samples 1 to 4 show that when the ratio S of an area of the Ag—Sn alloy to the area of the conductive portion 132a is less than 3%, the delamination occurs between the first electrode layer 131 and the second electrode layer 132.

Figure 9:
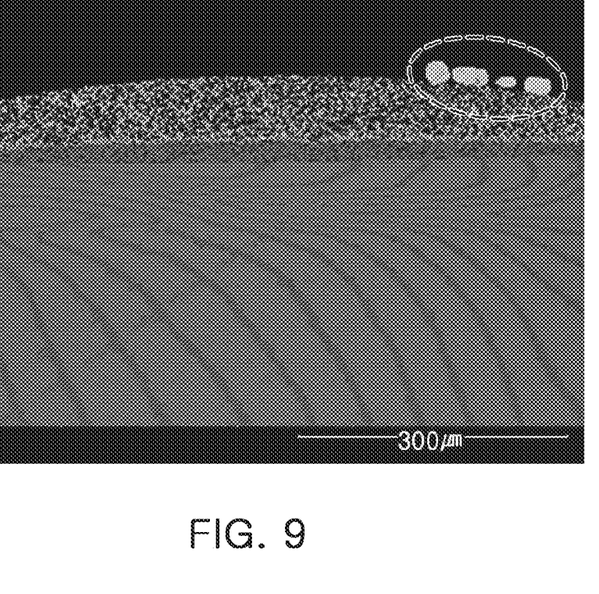
FIG. 9 is an image of Sn eluted from an outer surface of the second electrode layer.

Samples 10 to 13 show that when the ratio S of an area of the Ag—Sn alloy to the area of the conductive portion 132a is more than 50%, excess tin (Sn) in the conductive portion 132a is eluted to the outer surface of the second electrode layer 132, as shown in FIG. 9.

Samples 5 to 9 show that when the ratio S of an area of the Ag—Sn alloy to the area of the conductive portion 132a satisfies 3 to 50%, the delamination is suppressed and excess Sn is not eluted.

As set forth above, the multilayer electronic component according to an exemplary embodiment of the present disclosure may suppress the delamination occurring at the interface between the sintered electrode layer and the conductive resin layer by outgas generated from the conductive resin layer when the multilayer electronic component is reflowed at a high temperature.

The multilayer electronic component according to an exemplary embodiment of the present disclosure may also prevent excessive tin (Sn) in the conductive resin layer from being eluted to the surface of the external electrode, thus having the improved plating characteristics.

The multilayer electronic component according to an exemplary embodiment of the present disclosure may also have the improved electrical connection between the sintered electrode layer and the conductive resin layer.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and a plurality of internal electrodes stacked on each other interposing the dielectric layer therebetween, and external electrodes respectively disposed on the body,
wherein the external electrode includes:
a first electrode layer connected to the internal electrode; and
a second electrode layer disposed on the first electrode layer, and including a conductive portion including an silver (Ag)-tin (Sn) alloy and a resin, and
a ratio of an area of the Ag—Sn alloy to an area of the conductive portion satisfies 3 to 50% in at least a portion of a cross-section of the second electrode layer.

2. The multilayer electronic component of claim 1, wherein the conductive portion further includes a plurality of metal particles and a connection portion connected to the plurality of metal particles, and
the Ag—Sn alloy is included in the connection portion.

3. The multilayer electronic component of claim 2, wherein the connection portion further includes a first intermetallic compound.

4. The multilayer electronic component of claim 3, wherein the first intermetallic compound includes at least one of $Cu_3Sn$ and $Cu_6Sn_5$.

5. The multilayer electronic component of claim 2, wherein at least a portion of the connection portion is indirect contact with at least a portion of the first electrode layer.

6. The multilayer electronic component of claim 2, wherein the plurality of metal particles include at least one of silver (Ag) and silver (Ag) coated copper (Cu).

7. The multilayer electronic component of claim 2, wherein the connection portion includes at least one of tin (Sn) and a tin (Sn) alloy.

8. The multilayer electronic component of claim 1, further comprising an interface layer disposed between the first and second electrode layers and including a second intermetallic compound.

9. The multilayer electronic component of claim 8, wherein the second intermetallic compound is $Cu_3Sn$.

10. The multilayer electronic component of claim 8, wherein the interface layer has a shape of a plurality of islands.

11. The multilayer electronic component of claim 1, wherein the conductive portion further includes a first intermetallic compound.

12. The multilayer electronic component of claim 11, wherein the first intermetallic compound includes at least one of $Cu_3Sn$ and $Cu_6Sn_5$.

13. The multilayer electronic component of claim 1, further comprising third electrode layers formed on the second electrode layer.

14. The multilayer electronic component of claim 13, wherein the third electrode layers are a nickel (Ni) plating layer and a tin (Sn) plating layer, sequentially stacked on the second electrode layer.

15. A multilayer electronic component comprising:
a body including a dielectric layer and a plurality of internal electrodes stacked on each other interposing the dielectric layer therebetween, and external electrodes respectively disposed on the body,
wherein the external electrode includes:
a first electrode layer connected to the internal electrode; and
a second electrode layer disposed on the first electrode layer, and including a conductive portion including an silver (Ag)-tin (Sn) alloy, an intermetallic compound containing tin (Sn), and a resin,
a ratio of an area of the Ag—Sn alloy to an area of the conductive portion satisfies 3 to 50% in at least a portion of a cross-section of the second electrode layer, and
a total area of the Ag—Sn alloy and the intermetallic compound in at least a portion of the cross-section of the second electrode layer is higher than a total area of the Ag—Sn alloy and the intermetallic compound in at least a portion of a cross-section of the first electrode layer.

16. The multilayer electronic component of claim 15, wherein the intermetallic compound includes at least one of $Cu_3Sn$ and $Cu_6Sn_5$.

17. The multilayer electronic component of claim 15, wherein the Ag—Sn alloy includes $Ag_3Sn$.

18. The multilayer electronic component of claim 15, wherein the first electrode layer has an amount of tin (Sn) that is lower than an amount of tin (Sn) in the second electrode layer.

19. The multilayer electronic component of claim 15, wherein the conductive portion further includes a plurality of metal particles and a connection portion connected to the plurality of metal particles.

20. The multilayer electronic component of claim 19, wherein at least a portion of the connection portion is indirect contact with at least a portion of the first electrode layer.

21. The multilayer electronic component of claim 19, wherein the plurality of metal particles include at least one of silver (Ag) and silver (Ag) coated copper (Cu).

22. The multilayer electronic component of claim 19, wherein the connection portion includes at least one of tin (Sn) and a tin (Sn) alloy.

23. The multilayer electronic component of claim 15, further comprising an interface layer disposed between the first and second electrode layers and including $Cu_3Sn$.

* * * * *